United States Patent
Heckel et al.

(10) Patent No.: US 11,220,956 B2
(45) Date of Patent: Jan. 11, 2022

(54) METHOD FOR DETECTING BELT SLIP

(71) Applicant: Schaeffler Technologies AG & Co. KG, Herzogenaurach (DE)

(72) Inventors: Martin Heckel, Nuremberg (DE); Arno Bächstädt, Möhrendorf (DE); Christian Hoffmann, Forchheim (DE); Massimo Abrate, Weisendorf (DE); Vladimir Baranov, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 265 days.

(21) Appl. No.: 16/610,945

(22) PCT Filed: Apr. 10, 2018

(86) PCT No.: PCT/DE2018/100325
§ 371 (c)(1),
(2) Date: Nov. 5, 2019

(87) PCT Pub. No.: WO2018/206035
PCT Pub. Date: Nov. 15, 2018

(65) Prior Publication Data
US 2020/0056536 A1 Feb. 20, 2020

(30) Foreign Application Priority Data
May 11, 2017 (DE) ...................... 10 2017 110 192.6

(51) Int. Cl.
*F02B 63/04* (2006.01)
*F02B 67/06* (2006.01)
*F16H 7/08* (2006.01)

(52) U.S. Cl.
CPC ............ *F02B 63/042* (2013.01); *F02B 67/06* (2013.01); *F16H 7/08* (2013.01);
(Continued)

(58) Field of Classification Search
CPC ..... F16H 2007/0861; F16H 2007/0885; F16H 2007/0823
(Continued)

(56) References Cited

U.S. PATENT DOCUMENTS 4,478,595 A * 10/1984 Hayakawa ............ F02B 77/081
474/109
4,731,044 A * 3/1988 Mott ................. F16H 61/66272
474/8

(Continued)

FOREIGN PATENT DOCUMENTS

| CN | 101644200 A | 2/2010 |
|---|---|---|
| CN | 102530512 A | 7/2012 |

(Continued)

*Primary Examiner* — Henry Y Liu

(57) ABSTRACT

The disclosure relates to a method for detecting belt slip of a belt drive driving a generator of an internal combustion engine, said belt drive having a belt tensioner that can be adjusted in operation and adjusts the pre-tensioning force of the belt according to the detected belt slip. According to said method, the rotational speed profile of the crankshaft is recorded during an angular window of the crankshaft of m·360 degrees and an average value of the crankshaft rotational speed is formed from said rotational speed profile; temporally independently from the recording of the rotational speed profile of the crankshaft, the rotational speed course of the generator shaft is recorded during an angular window of the generator shaft of $n \cdot u^{-1} \cdot 360$ degrees and an average value of the generator shaft rotational speed is formed from said rotational speed profile.

13 Claims, 2 Drawing Sheets

Figure 1:
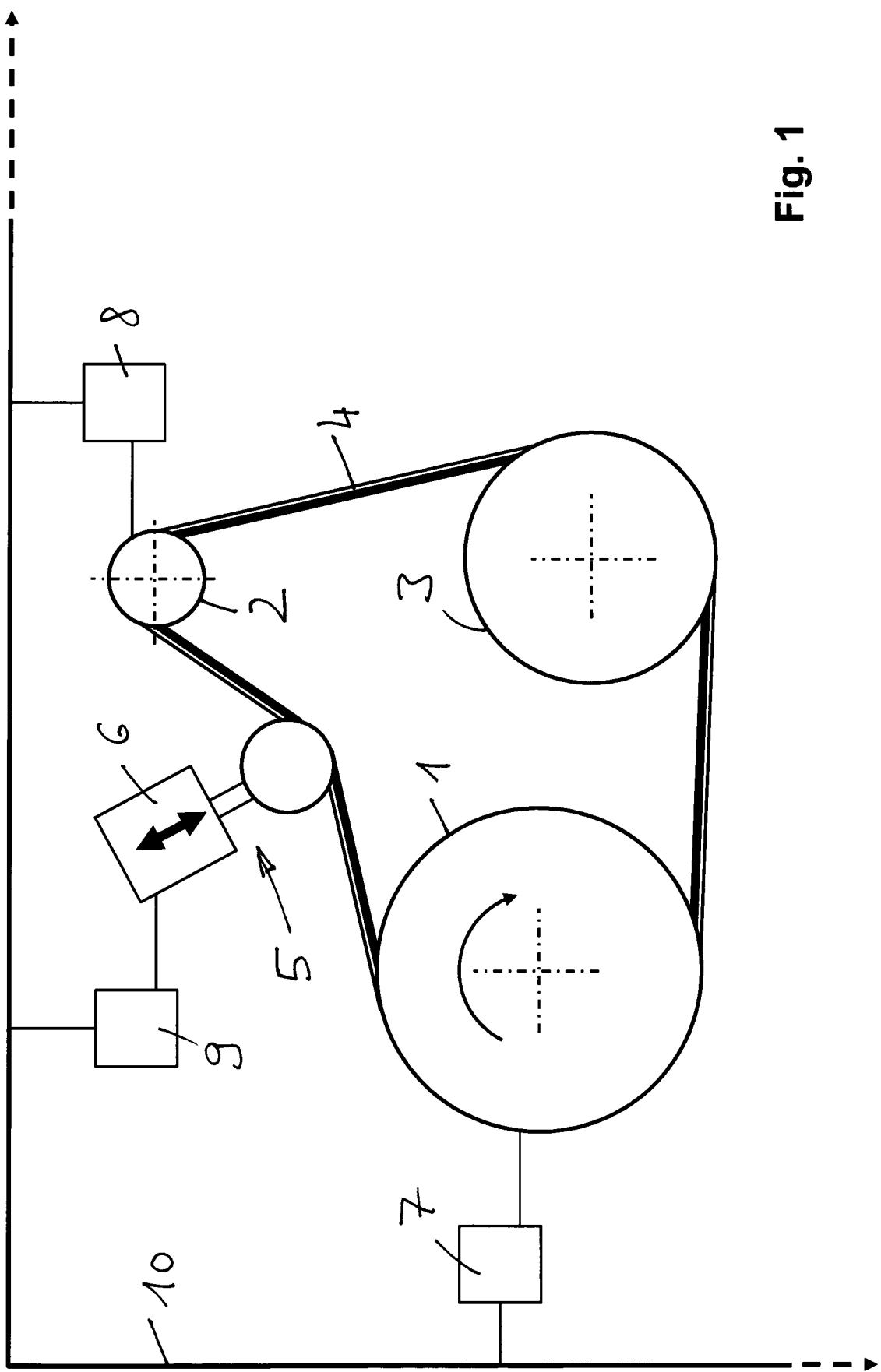

(52) U.S. Cl.
CPC .............. *F16H 2007/0823* (2013.01); *F16H 2007/0865* (2013.01); *F16H 2007/0885* (2013.01)

(58) Field of Classification Search
USPC ................................................ 474/101, 102
See application file for complete search history.

(56) References Cited

U.S. PATENT DOCUMENTS

| | | | | |
|---|---|---|---|---|
| 5,161,424 A * | 11/1992 | Saberton | ................ | F16H 57/12 474/102 |
| 6,511,393 B1 * | 1/2003 | Bogl | ...................... | F01L 1/024 474/101 |
| 6,834,228 B2 * | 12/2004 | Serkh | ..................... | F02B 67/06 701/115 |
| 6,849,011 B2 * | 2/2005 | Calfa | .................... | F16H 7/1281 474/101 |
| 8,112,193 B2 * | 2/2012 | Yurgil | .................... | B60K 6/485 701/33.8 |
| 8,215,282 B2 * | 7/2012 | McDonald | ............ | B60W 30/20 123/198 R |
| 8,914,190 B2 * | 12/2014 | Detrois | .................. | F02B 67/06 701/36 |
| 9,151,366 B2 * | 10/2015 | Antchak | ............... | F16H 7/1263 |
| 9,328,806 B2 * | 5/2016 | Noguchi | ............... | F16H 7/1281 |
| 9,334,932 B2 * | 5/2016 | Antchak | ............... | F16H 7/1281 |
| 9,447,850 B2 * | 9/2016 | Farewell | .............. | F16H 7/1281 |
| 9,464,697 B2 * | 10/2016 | Antchak | ................. | F16H 7/12 |
| 9,739,347 B2 * | 8/2017 | Petridis | .................. | F02N 19/00 |
| 9,863,310 B2 * | 1/2018 | Pendovski | .............. | F16H 7/08 |
| 10,029,695 B1 * | 7/2018 | Gibson | ................ | B60W 10/08 |
| 2002/0123401 A1 * | 9/2002 | Henry | ..................... | F01L 13/08 474/101 |
| 2002/0128099 A1 * | 9/2002 | Winklhofer | ............... | F01L 1/02 474/102 |
| 2003/0216205 A1 * | 11/2003 | Meckstroth | ........... | F16H 7/1227 474/135 |
| 2004/0063529 A1 * | 4/2004 | Mare | ........................ | F16H 7/14 474/109 |
| 2004/0102272 A1 * | 5/2004 | Calfa | .................... | F16H 7/1281 474/102 |
| 2005/0124447 A1 * | 6/2005 | Message | ............... | F16H 7/1281 474/135 |
| 2005/0148420 A1 * | 7/2005 | Murao | ................... | F01L 1/024 474/133 |
| 2005/0192142 A1 * | 9/2005 | Stone | .................... | F16H 7/1281 474/101 |
| 2005/0282668 A1 * | 12/2005 | Ali | ....................... | F16H 7/1218 474/101 |
| 2006/0172834 A1 * | 8/2006 | Laubender | ............. | G01B 17/08 474/106 |
| 2006/0178240 A1 * | 8/2006 | Hansel | .................. | F02B 77/081 474/135 |
| 2006/0219040 A1 * | 10/2006 | Petri | ......................... | F16H 7/14 74/469 |
| 2006/0240922 A1 * | 10/2006 | Pendergrass | .......... | F16H 7/1281 474/102 |
| 2006/0276284 A1 * | 12/2006 | Lancaster | ............. | F16H 7/1263 474/110 |
| 2007/0142145 A1 * | 6/2007 | Namuduri | ............. | F16H 7/1236 474/110 |
| 2009/0195203 A1 * | 8/2009 | Yurgil | .................... | B60W 10/30 318/452 |
| 2012/0065009 A1 * | 3/2012 | Mueller | .................. | F02B 67/06 474/101 |
| 2012/0259510 A1 * | 10/2012 | Detrois | .................... | F02B 67/06 701/36 |
| 2013/0172137 A1 * | 7/2013 | Antchak | .................... | F16H 7/12 474/133 |
| 2014/0130635 A1 * | 5/2014 | Kees | ......................... | F16H 7/08 74/7 R |
| 2014/0309882 A1 * | 10/2014 | Antchak | .................. | F16H 7/12 701/36 |
| 2015/0057117 A1 * | 2/2015 | Antchak | ............... | F16H 7/1281 474/109 |
| 2015/0119175 A1 * | 4/2015 | Mueller | ................. | F16H 7/1281 474/110 |
| 2015/0126315 A1 * | 5/2015 | Farewell | ............... | F16H 7/1281 474/109 |
| 2015/0167796 A1 * | 6/2015 | Noguchi | ................ | B60W 20/00 477/3 |
| 2015/0167797 A1 * | 6/2015 | Noguchi | ............. | F02N 11/0814 477/3 |
| 2015/0247559 A1 * | 9/2015 | Graves | .................. | F16H 7/1218 474/117 |
| 2015/0260264 A1 * | 9/2015 | Petridis | ..................... | F16H 7/08 474/110 |
| 2016/0007526 A1 * | 1/2016 | Greulich | ................ | F16H 7/08 56/10.2 R |
| 2016/0160830 A1 * | 6/2016 | Noguchi | ................. | F02B 67/06 123/179.25 |
| 2016/0318519 A1 * | 11/2016 | Hirai | ....................... | F02N 11/04 |
| 2016/0363046 A1 * | 12/2016 | Pendovski | ................ | F16H 7/08 |
| 2017/0138445 A1 * | 5/2017 | Farewell | ................ | F02B 67/06 |
| 2017/0166197 A1 * | 6/2017 | Jang | ......................... | B60K 6/46 |
| 2017/0175858 A1 * | 6/2017 | Ryeland | ............... | F16H 7/0836 |
| 2017/0204945 A1 * | 7/2017 | Emig | ........................ | F16H 7/02 |
| 2017/0370448 A1 * | 12/2017 | Hansen | ..................... | F16H 7/12 |

FOREIGN PATENT DOCUMENTS

| | | |
|---|---|---|
| CN | 103313869 A | 9/2013 |
| CN | 104912715 A | 9/2015 |
| DE | 102010024203 A1 | 12/2011 |
| DE | 102010044864 A1 | 3/2012 |
| DE | 102014220926 A1 | 4/2016 |
| EP | 2491235 B1 | 12/2015 |

* cited by examiner

METHOD FOR DETECTING BELT SLIP

The invention relates to a method for detecting belt slip of a belt drive driving a generator of an internal combustion engine, the belt of which is wrapped around a crankshaft pulley, which is arranged on the crankshaft of the internal combustion engine, and a generator pulley, which is arranged on the generator shaft of the generator, and which has a belt tensioner that can be adjusted in operation and adjusts the pre-tensioning force of the belt according to the detected belt slip.

The generator, which is incorporated into an auxiliary unit belt drive of an internal combustion engine having a belt start-stop function, is operated as a driving motor in the starting or boost mode of the internal combustion engine, starting the internal combustion engine or assisting it with additional driving torque. In energy recovery mode, it is capable of absorbing braking energy. Owing to the high torque loading and the high alternating torques of the starter-generator in comparison with the operating behavior of a generator without a motor mode, impermissibly high belt slip may occur. As is known from EP 2 491 235 B1, this can be prevented by means of an actively adjustable belt tensioner and control of the belt slip. To detect belt slip in this context, the rotational speed difference between the crankshaft and the generator shaft is used. If this rotational speed difference exceeds a setpoint, the belt pre-tension is increased by adjusting the belt tensioner.

However, the accuracy of this control may be insufficient if, on the one hand, the two rotational speed signals of the crankshaft and of the generator shaft are recorded and processed in a temporally independent manner and if, on the other hand, the profile of these rotational speeds fluctuates nonuniformly, as is the case with internal combustion engines with a highly irregular crankshaft rotational speed. This is because the formation of the rotational speed difference, which is based on instantaneous rotational speed values, which are recorded and set in relation at different times, can lead to a falsified result in comparison with the actual belt slip. The mutually independent detection of the rotational speed signals is performed, in particular, in separate control units, operating asynchronously with a time phase offset, for the internal combustion engine and the generator, wherein these control units are referred to below for short as the engine ECU and the generator ECU.

It is the object of the present invention to specify a method for detecting belt slip of the type stated at the outset with higher accuracy of belt slip detection.

This object is achieved by the features of claim 1, wherein, as characterizing features:
  the rotational speed profile of the crankshaft is recorded during an angular window of the crankshaft of m·360° and an average value of the crankshaft rotational speed is formed from said rotational speed profile,
  temporally independently of the recording of the rotational speed profile of the crankshaft, the rotational speed profile of the generator shaft is recorded during an angular window of the generator shaft of n·ü$^{-1}$·360° and an average value of the generator shaft rotational speed is formed from said rotational speed profile,
  it is checked whether the rotational speed relationship between the average value of the crankshaft rotational speed and the average value of the generator shaft rotational speed is within a nominal range,
  the belt tensioner is adjusted if the rotational speed relationship is outside the nominal range, and wherein m and n are real numbers and u is the transmission ratio between the crankshaft pulley and the generator pulley.

By virtue of the fact that the separate rotational speed information at the crankshaft and at the generator is recorded and averaged, and the average rotational speeds set in relation, in each case over a period of one or more crankshaft revolutions or generator shaft revolutions, which may not be integers, the phase shift which occurs during the processing of the rotational speed information is no longer relevant. The term "averaging" should be taken to include all known calculation methods that lead to the average value thereby formed. Typical average values are the arithmetic mean, the geometric mean and the root mean square value.

The numbers m and n are preferably natural numbers and, as a particular preference, are equal, wherein m=n=2 in the usual case of a four-stroke engine.

The term "rotational speed relationship" should of course be taken to mean not only the quotient but also the difference, or a relation which is mathematically equivalent thereto, of the rotational speeds set in relation.

Figure 2:
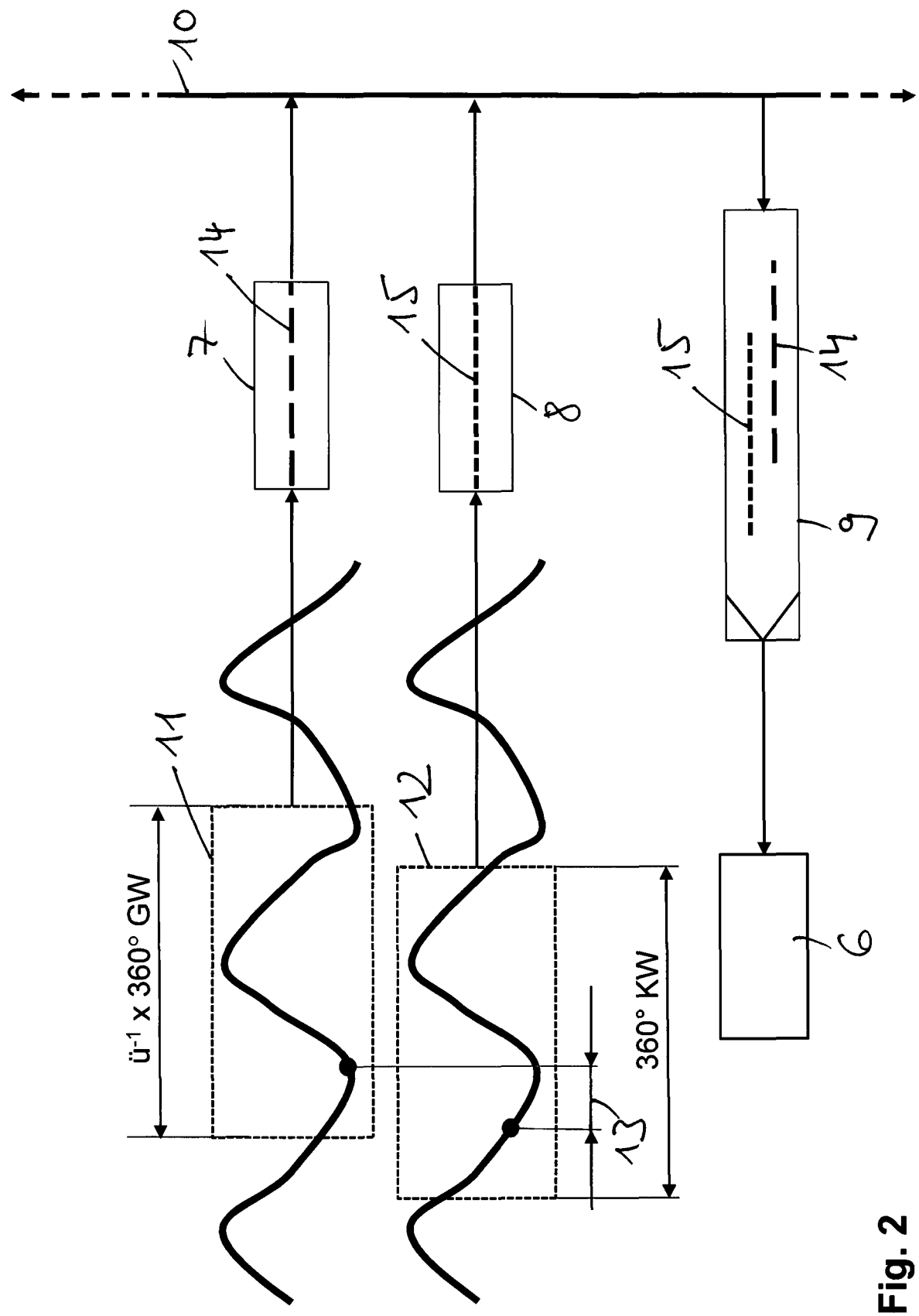

Further features of the invention will become apparent from the following description and the figures. In the drawing:

FIG. 1 shows an auxiliary unit belt drive of an internal combustion engine having a starter-generator in a schematic illustration, FIG. 2 shows a significant segment of the belt slip detection system according to the invention in a belt drive as per FIG. 1.

The auxiliary unit belt drive illustrated in FIG. 1 comprises a crankshaft pulley 1 arranged on the crankshaft of the internal combustion engine, a generator pulley 2 arranged on the generator shaft of a generator designed as a starter-generator, a pulley 3 of an air-conditioning compressor as a further auxiliary unit, and a belt 4 wrapped around the pulleys 1, 2 and 3, as well as an adjustable belt tensioner 5, which comprises an actuator 6 that adjusts the pre-tension of the belt 4 in operation depending on the belt slip. The belt tensioner 5 tensions the belt 4 in the generating slack strand clockwise in accordance with the direction of rotation indicated on the crankshaft pulley 1. The transmission ratio between the crankshaft pulley 1 and the generator pulley 2 is ü and, in the present case, 1/3.5.

The crankshaft rotational speed is recorded by a crankshaft sensor and fed as a signal to an engine ECU 7, which controls the internal combustion engine. The generator shaft rotational speed is recorded by a generator shaft sensor and, in the present case, by the Hall-effect sensor of the generator and fed as a signal to a generator ECU 8, which controls the generator. The belt tensioner 5 is controlled by a belt tensioner ECU 9. The engine ECU 7, the generator ECU 8 and the belt tensioner ECU 9 communicate with one another via a data bus system, which in the present case is a CAN bus 10.

FIG. 2 shows the fluctuation of the rotational speed profiles of the crankshaft and of the generator shaft with respect to time, these being typical for a modern internal combustion engine with a relatively high irregularity in the rotation of the crankshaft. The crankshaft sensor records the rotational speed profile of the crankshaft during an angular window 11 of one full revolution of the crankshaft, i.e. for an angle of 360° of the crankshaft, or KW for short. The generator shaft sensor records the rotational speed profile of the generator shaft during an angular window 12, which corresponds in terms of time to the recorded angular window of the crankshaft and, owing to the transmission ratio, comprises $1·ü^{-1}=3.5$ revolutions of the generator shaft, i.e. 1260° of the generator shaft, or GW for short. The relative offset 13 of the two angular windows 11 and 12 corresponds to the initially mentioned phase shift of the generator ECU 8 and the engine ECU 7, which, in the case of different rotation angle values as a reference and consequently time-shifted rotational speed values, would lead to an incorrectly evaluated rotational speed difference between the crankshaft and the generator shaft.

From the recorded rotational speed profiles of the crankshaft and of the generator shaft, an average value 14 of the crankshaft rotational speed is formed in the engine ECU 7, and an average value 15 of the generator shaft rotational speed is formed in the generator ECU 8. These average values 14, 15 are communicated as signals, via CAN bus 10, to the belt tensioner ECU 9, wherein the communication via the CAN bus 10 can be associated with an additional unknown phase shift in the signals.

The belt tensioner ECU 9 determines the rotational speed relationship between the average value 14 of the crankshaft rotational speed and the average value 15 of the generator shaft rotational speed and checks whether this rotational speed relationship is within or outside a predetermined nominal range. In the case of belt slip, the rotational speed relationship is outside the nominal range, whereupon the belt tensioner ECU 9 controls the actuator 6 of the belt tensioner 5 to produce an increase in the belt pre-tensioning force.

Alternative or optional method steps:
the rotational speed relationship between the average value 14 of the crankshaft rotational speed and the average value 15 of the generator shaft rotational speed is checked outside the belt tensioner ECU 9, e.g. by the engine ECU 7 or by the generator ECU 8 recording and integrating the rotational speed profiles of the crankshaft and the generator shaft over a predetermined time interval and respective integration to give a rotation angle of the crankshaft and a rotation angle of the generator shaft checking whether the rotation angle relationship between the crankshaft angle and the generator shaft angle is within a nominal range using the method in an auxiliary unit belt drive having a generator without engine starter/boosting mode.

The invention claimed is:

1. A method for detecting belt slip of a belt drive driving a generator of an internal combustion engine, the belt drive including: i) a belt wrapped around a crankshaft pulley arranged on a crankshaft of the internal combustion engine, ii) a generator pulley arranged on a generator shaft of the generator, and, iii) a belt tensioner that can be adjusted in operation of the belt drive and adjusts a pre-tensioning force of the belt according to detected belt slip, the method comprising:
recording a rotational speed profile of the crankshaft during an angular window of the crankshaft, defined by an equation $m·360°$, and forming an average value of crankshaft rotational speed from said rotational speed profile of the crankshaft,
recording a rotation speed profile of the generator shaft, temporally independently of the recording of the rotational speed profile of the crankshaft, during an angular window of the generator shaft defined by an equation $n·ü^{-1}·360°$, and forming an average value of generator shaft rotational speed from said rotational speed profile of the generator shaft,
whether a rotational speed relationship between the average value of the crankshaft rotational speed and the average value of the generator shaft rotational speed is within a nominal range,
adjusting the belt tensioner if the rotational speed relationship is outside the nominal range, and
wherein m and n are real numbers and ü is a transmission ratio between the crankshaft pulley and the generator pulley.

2. The method as claimed in claim 1, wherein m and n are natural numbers.

3. The method as claimed in claim 2, wherein m=n=2.

4. The method as claimed in claim 1, wherein the internal combustion engine is controlled by an engine ECU, the generator is controlled by a generator ECU, and the belt tensioner is controlled by a belt tensioner ECU, and the engine ECU, the generator ECU and the belt tensioner ECU communicate with one another via a data bus system.

5. The method as claimed in claim 4, wherein the average value of the crankshaft rotational speed is formed by the engine ECU, and the average value of the generator shaft rotational speed is formed by the generator ECU, and the belt tensioner ECU; i) forms the rotational speed relationship between the average value of the crankshaft rotational speed and the average value of the generator shaft rotational speed, ii) checks whether the rotational speed relationship is within the nominal range, and iii) controls the belt tensioner for a purpose of adjusting said tensioner if the rotational speed relationship is outside the nominal range.

6. The method as claimed in claim 1, wherein the average value of at least one of the crankshaft rotational speed or the generator shaft rotational speed is an arithmetic mean, geometric mean, or root mean square value.

7. A method for detecting belt slip of a belt drive, the belt drive including:
a crankshaft pulley arranged on a crankshaft of an internal combustion engine,
a generator pulley arranged on a generator shaft,
a belt wrapped around the crankshaft pulley and the generator pulley, and
a belt tensioner arranged to adjust belt tension during operation of the belt drive according to detected belt slip, the method comprising:
recording a rotational speed profile of the crankshaft during a first angular window,
forming an average value of crankshaft rotational speed from the rotational speed profile of the crankshaft,
recording a rotational speed profile of the generator shaft during a second angular window,
forming an average value of generator shaft rotational speed from the rotational speed profile of the generator shaft,
checking whether a rotational speed relationship between the average value of the crankshaft rotational speed and the average value of the generator shaft rotational speed is within a nominal range, and
adjusting the belt tensioner if the rotational speed relationship is outside the nominal range.

8. The method as claimed in claim 7, wherein the second angular window is equal to the first angular window in terms of time.

9. The method as claimed in claim 8, wherein in the second angular window, a number of rotations of the generator shaft exceeds a number of rotations of the crankshaft within the first angular window by a factor of $ü^{-1}$, wherein ü is a transmission ratio between the crankshaft pulley and the generator pulley.

10. The method as claimed in claim 8, wherein the first angular window is offset from second angular window in terms of time.

11. A belt tensioner for a belt drive system including a crankshaft and a generator, the belt tensioner configured to adjust belt tension during operation of the belt drive system according to detected belt slip determined by checking a rotational speed relationship between an average value of crankshaft rotational speed obtained from a first angular window to an average value of generator rotational speed obtained from a second angular window.

12. The belt tensioner of claim 11, wherein if the rotational speed relationship is outside of a nominal range, the belt tensioner is adjusted to increase the belt tension.

13. The belt tensioner of claim 11, wherein the belt tensioner includes an actuator that adjusts the belt tension during operation of the belt drive system.

\* \* \* \* \*